US009201460B2

(12) United States Patent
Su

(10) Patent No.: US 9,201,460 B2
(45) Date of Patent: Dec. 1, 2015

(54) ELECTRONIC DEVICE WITH TOUCH FUNCTION

(75) Inventor: Yung-Chun Su, New Taipei (TW)

(73) Assignee: Qisda Corporation, Taoyuan County (TW)

( * ) Notice: Subject to any disclaimer, the term of this patent is extended or adjusted under 35 U.S.C. 154(b) by 1142 days.

(21) Appl. No.: 13/210,391

(22) Filed: Aug. 16, 2011

(65) Prior Publication Data

US 2012/0045086 A1 Feb. 23, 2012

(30) Foreign Application Priority Data

Aug. 20, 2010 (TW) .............................. 99127925 A

(51) Int. Cl.
G06F 3/041 (2006.01)
G06F 1/16 (2006.01)
(52) U.S. Cl.
CPC .................................... G06F 1/1643 (2013.01)
(58) Field of Classification Search
CPC ................ G06F 1/1643; G06F 1/1692; G06F 2203/04103
USPC ............................................ 345/173; 349/12
See application file for complete search history.

(56) References Cited

U.S. PATENT DOCUMENTS

| 5,510,813 | A * | 4/1996 | Makinwa et al. ............... 345/173 |
| 6,532,152 | B1 * | 3/2003 | White et al. .................... 361/692 |
| 7,161,639 | B2 * | 1/2007 | Nishiyama et al. ............. 349/12 |
| 7,237,937 | B2 * | 7/2007 | Kawashima et al. ......... 362/602 |
| 8,487,887 | B2 * | 7/2013 | Yu et al. ......................... 345/173 |
| 8,525,812 | B2 * | 9/2013 | Tanaami ......................... 345/174 |
| 2001/0000961 | A1 * | 5/2001 | Hikida et al. .................. 345/173 |
| 2004/0141110 | A1 * | 7/2004 | Yu et al. ......................... 349/110 |
| 2005/0146516 | A1 * | 7/2005 | Nishiyama ..................... 345/176 |
| 2005/0168450 | A1 * | 8/2005 | Ito ................................... 345/173 |
| 2005/0184969 | A1 * | 8/2005 | Dunn et al. .................... 345/173 |
| 2007/0002192 | A1 * | 1/2007 | Nishino et al. ................... 349/12 |
| 2008/0100589 | A1 * | 5/2008 | Tsao ............................... 345/173 |
| 2009/0079706 | A1 * | 3/2009 | Mishima et al. ............... 345/173 |
| 2009/0153506 | A1 * | 6/2009 | Liu et al. ........................ 345/173 |
| 2010/0026648 | A1 * | 2/2010 | Kimura et al. ................. 345/173 |
| 2010/0033442 | A1 * | 2/2010 | Kusuda et al. ................. 345/173 |
| 2010/0073316 | A1 * | 3/2010 | Nozawa et al. ................. 345/173 |
| 2010/0164885 | A1 * | 7/2010 | Hosorogi ....................... 345/173 |
| 2010/0188354 | A1 * | 7/2010 | Tamura .......................... 345/173 |
| 2010/0220071 | A1 * | 9/2010 | Nishihara et al. ............. 345/173 |
| 2010/0309152 | A1 * | 12/2010 | Kusuda et al. ................. 345/173 |
| 2011/0001712 | A1 * | 1/2011 | Saito .............................. 345/173 |
| 2011/0025621 | A1 * | 2/2011 | Kawabe ......................... 345/173 |
| 2011/0069020 | A1 * | 3/2011 | Kim et al. ...................... 345/173 |
| 2011/0148784 | A1 * | 6/2011 | Lee ................................. 345/173 |
| 2011/0175841 | A1 * | 7/2011 | Nakamura et al. ............ 345/173 |
| 2011/0199334 | A1 * | 8/2011 | Hwang et al. ................. 345/174 |
| 2011/0254778 | A1 * | 10/2011 | Wang et al. .................... 345/173 |

(Continued)

FOREIGN PATENT DOCUMENTS

CN 2783367 Y 5/2006
CN 101051253 A 10/2007

(Continued)

*Primary Examiner* — Rodney Fuller

(57) ABSTRACT

An electronic device with touch function includes a back casing, a front casing, a display panel and a touch panel. The front casing is combined with the back casing so as to form an accommodating space. The display panel is disposed in the accommodating space. The touch panel is fixed to the front casing and the touch panel is departed from the display panel with a predetermined distance.

16 Claims, 4 Drawing Sheets

(56) References Cited

U.S. PATENT DOCUMENTS

2011/0304564 A1* 12/2011 Kim et al. ............... 345/173
2012/0062478 A1* 3/2012 Kim et al. ............... 345/173

FOREIGN PATENT DOCUMENTS

| TW | I282936 | 6/2007 |
| TW | 200813796 | 3/2008 |

* cited by examiner

ELECTRONIC DEVICE WITH TOUCH FUNCTION

BACKGROUND OF THE INVENTION

1. Field of the Invention

The invention relates to an electronic device with touch function and, more particularly, to a full-face electronic device with touch function.

2. Description of the Prior Art

Since consumer electronic products have become more and more lighter, thinner, shorter, and smaller, there is no space on these products for containing a conventional input device, such as a mouse, a keyboard, a stylus, etc. With development of touch technology, in various kinds of consumer electronic products (e.g. a display device, an all-in-one machine, a mobile phone, or a personal digital assistant (PDA)), a touch panel has become a main tool for data input.

In the prior arts, a display panel and a touch panel are fixed to each other immediately by glue and then installed in an electronic device, such as a display device or an all-in-one machine, so as to achieve touch function. However, there is always a step-shaped structure between an edge of the touch panel and a frame of the electronic device, such that the electronic device cannot present a full-face vision effect for a user. Furthermore, when the exposed touch panel is hit by en external force, the display panel, which is adhered to the touch panel tightly, may be attacked by the external force through the touch panel to be damaged. Since the cost of the display panel is higher than that of the touch panel, it will cause a great loss for a consumer or manufacturer once the display panel is damaged. Moreover, since the display panel and the touch panel are fixed to each other immediately by glue, the display panel and the touch panel cannot be detached from each other easily once the display panel or the touch panel has to be replaced with a new one. When the display panel and the touch panel are detached from each other, the other one may be damaged easily.

SUMMARY OF THE INVENTION

Therefore, an objective of the invention is to provide a full-face electronic device with touch function to solve the aforesaid problems.

According to an embodiment of the invention, an electronic device with touch function comprises a back casing, a front casing, a display panel and a touch panel. The front casing is combined with the back casing so as to form an accommodating space. The display panel is disposed in the accommodating space. The touch panel is fixed to the front casing and departed from the display panel with a predetermined distance.

In this embodiment, the display panel can be fixed to a first side of the front casing, the touch panel can be adhered to a second side of the front casing by a glue, the second side is opposite to the first side, and the predetermined distance is larger than a thickness of the glue.

In this embodiment, the front casing has a frame located at the second side, a recess is formed within the frame, the touch panel comprises a touch module and a substrate, and the substrate is located at a lower surface of the touch module and accommodated in the recess, wherein the lower surface of the touch module can cover the frame completely.

As mentioned in the above, the touch panel and the display panel of the invention are fixed to the first side and the second side of the front casing respectively, so that the touch panel and the display panel are separated by a predetermined distance. Therefore, once the exposed touch panel is hit by an external force, the predetermined distance acts as a cushion to the display panel, such that the display panel having higher cost will not be damaged. Furthermore, the damaged touch panel can be replaced by a new one individually without detaching the display panel from the electronic device. Moreover, since the lower surface of the touch module can cover the frame of the front casing completely, the electronic device of the invention can present a full-face vision effect for a user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
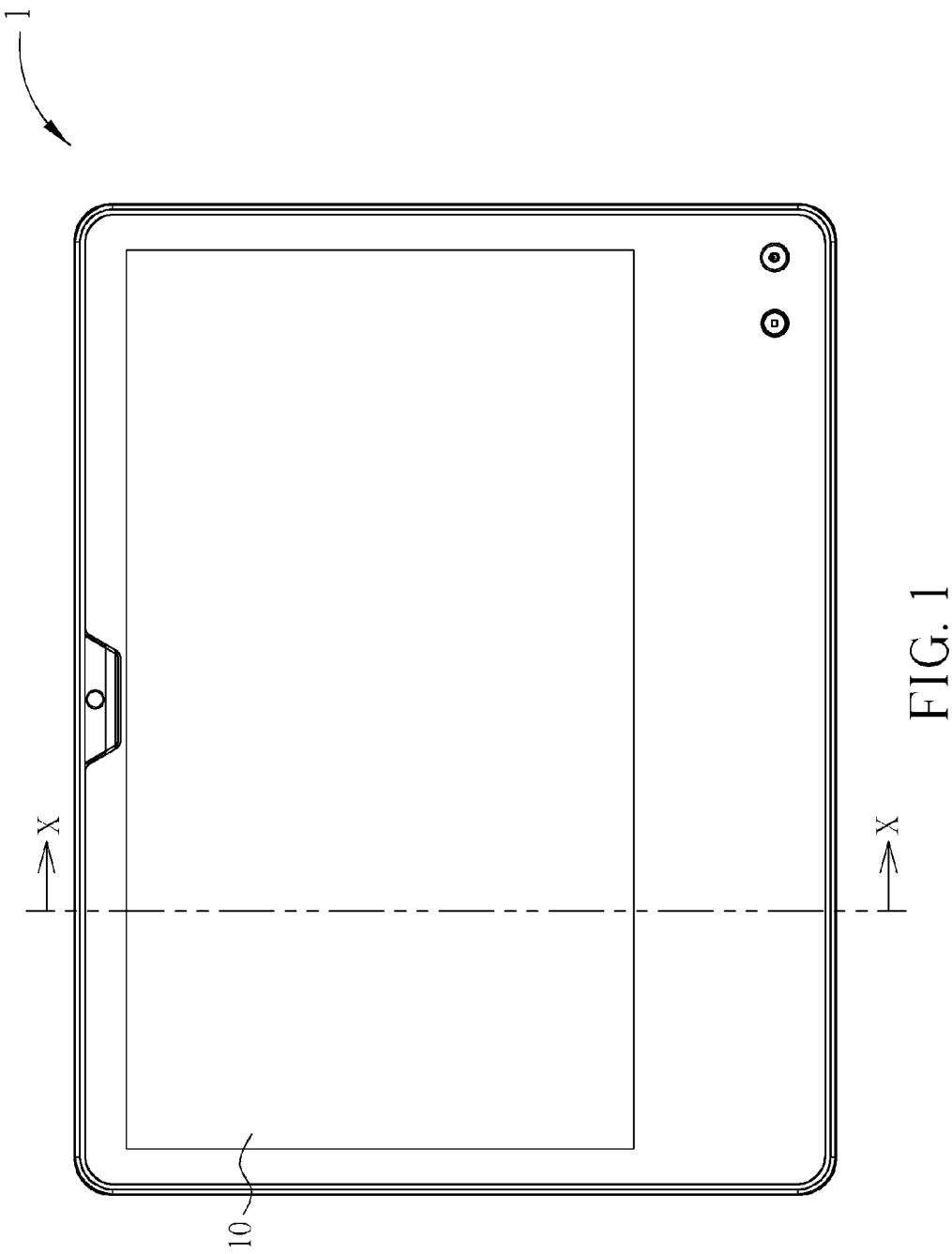
FIG. 1 is a schematic diagram illustrating an electronic device with touch function according to an embodiment of the invention.
Figure 2:
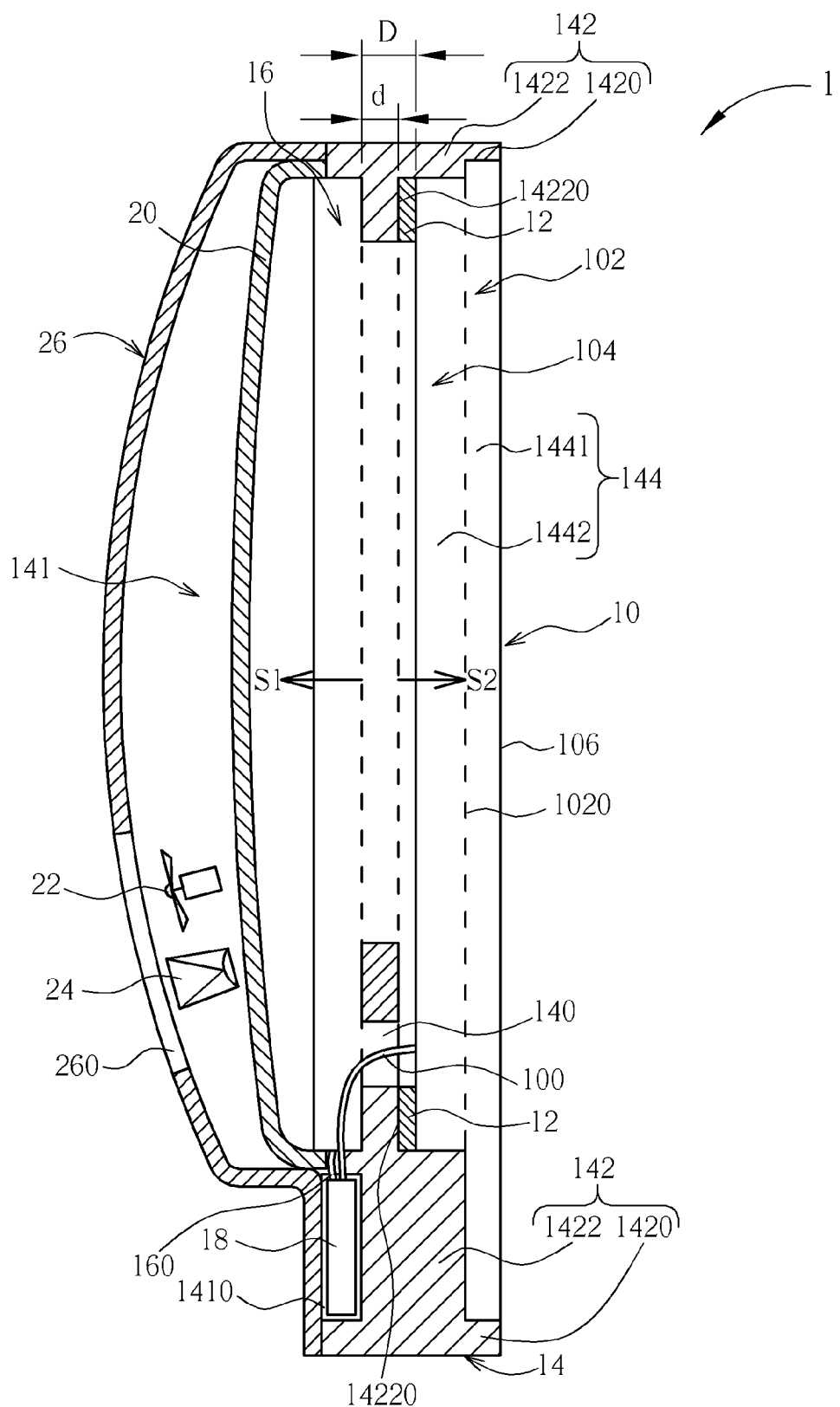
FIG. 2 is a sectional view illustrating the electronic device shown in FIG. 1 along X-X line.
Figure 3:
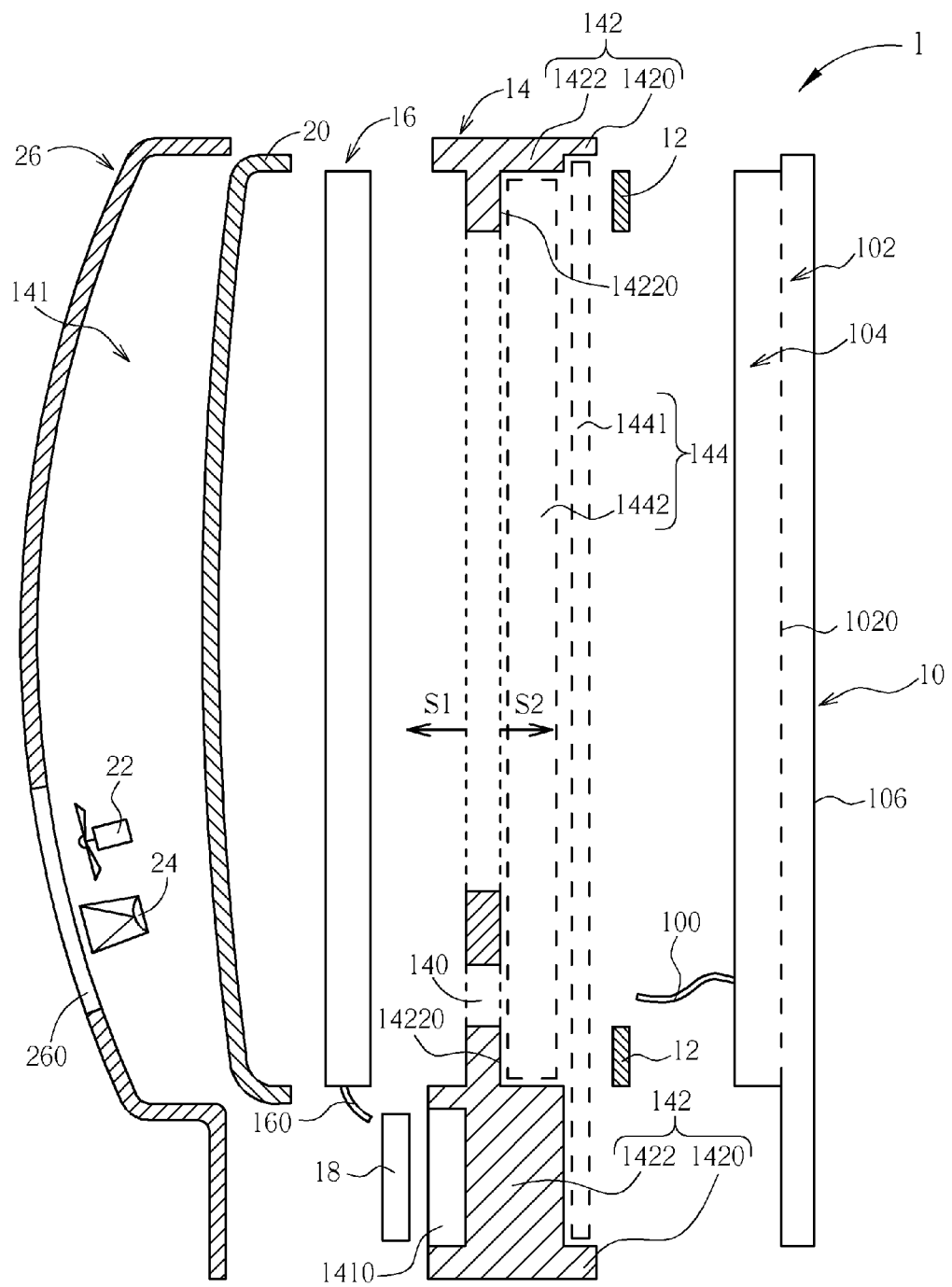
FIG. 3 is an exploded view illustrating the electronic device shown in FIG. 2.
Figure 4:
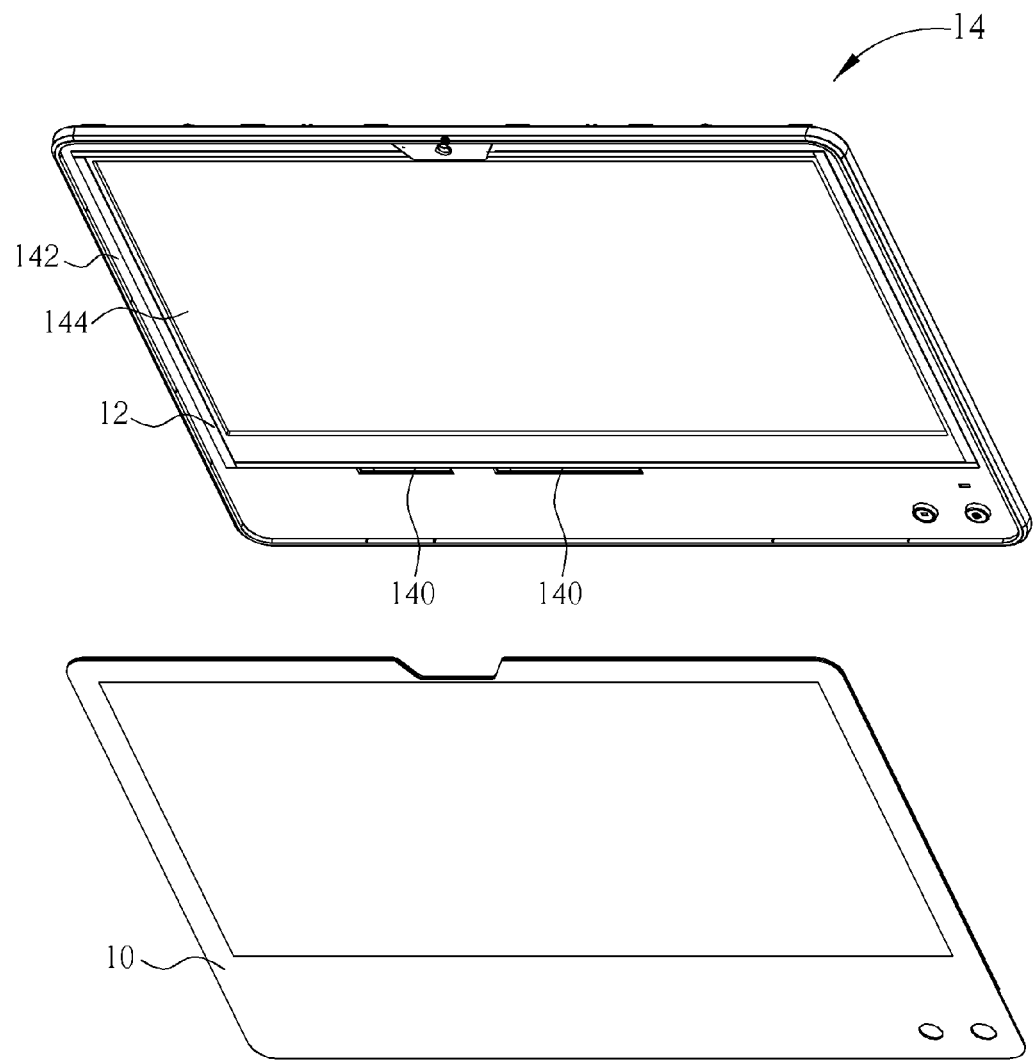
FIG. 4 is an exploded view illustrating parts of the electronic device shown in FIG. 1.

Referring to FIGS. 1 to 4, FIG. 1 is a schematic diagram illustrating an electronic device 1 with touch function according to an embodiment of the invention, FIG. 2 is a sectional view illustrating the electronic device 1 shown in FIG. 1 along X-X line, FIG. 3 is an exploded view illustrating the electronic device 1 shown in FIG. 2, and FIG. 4 is an exploded view illustrating parts of the electronic device 1 shown in FIG. 1. As shown in FIG. 2, the electronic device 1 with touch function comprises a touch panel 10, a glue 12, a front casing 14, a display panel 16, a circuit board 18, a shielding member 20, a heat dissipating unit 22, a speaker 24 and a back casing 26. In practical applications, the electronic device 1 may be a display device, an all-in-one machine, a mobile phone, a personal digital assistant or other electronic devices equipped with the touch panel 10.

Generally speaking, the electronic device 1 may be equipped with some necessary hardware and/or software components for specific purposes, such as a Central Processing Unit (CPU), a memory, a storage device, a power supply, an operating system, etc, and it depends on practical demands. Functions of the aforesaid components are known for those skilled in the art, so it will not be depicted herein.

As shown in FIGS. 2 and 3, the front casing 14 is combined with the back casing 26 so as to form an accommodating space 141. The display panel 16, the circuit board 18, the shielding member 20, the heat dissipating unit 22 and the speaker 24 are disposed in the accommodating space 141. The back casing 26 has an opening 260 and the heat dissipating unit 260 can dissipate heat, which is generated during the operation of the electronic device 1, via the opening 260. Also, the speaker 24 can generate sounds via the opening 260. In practical applications, the display panel 16 can be a liquid crystal display (LCD) panel, an organic light-emitting diode (OLED) display panel, a plasma display panel (PDP) or other display panels with image display function, the heat dissipating unit 22 can be a heat dissipating fan, and the speaker 24 can be a sound broadcasting device. Furthermore, the display panel 16 is fixed to the shielding member 20. The shielding member 20 can be made of metal for preventing Electro-Magnetic Interference (EMI).

As shown in FIG. 2, the display panel 16, which is fixed to the shielding member 20, can be fixed to a first side S1 of the front casing 14, and the touch panel 10 can be fixed to a second side S2, which is opposite to the first side S1, of the front casing 14 by a glue 12. Since the display panel 16 and the touch panel 10 are fixed to the opposite sides of the front casing 14 respectively, the touch panel 10 is departed from the display panel 16 with a predetermined distance D, such that the touch panel 10 is not fixed to the display panel 16 immediately.

As shown in FIGS. 2 to 4, in a preferred embodiment, the front casing 14 has a frame 142 located at the second side S2 and a recess 144 is formed within the frame 142. In this embodiment, the recess 144 may comprise a first recess portion 1441 and a second recess portion 1442, and the frame 142 may comprise a first step-shaped structure 1420 and a second step-shaped structure 1422. The first step-shaped structure 1420 and the second step-shaped structure 1422 surrounds a touch surface 106 of the touch panel 10 so as to form the first recess portion 1441 and the second recess portion 1442. Furthermore, the touch panel 10 comprises a touch module 102 and a substrate 104, the substrate 104 is located at a lower surface 1020 of the touch module 102, and the touch module 102 is accommodated in the first recess portion 1441. The first step-shaped structure 1420 and the touch module 102 are at an identical level substantially and the substrate 104 is accommodated in the second recess portion 1442. The bottom 14220 of the second step-shaped structure 1422 has a thickness d, the thickness d extends along a normal of the display surface, and the predetermined distance D is determined by the thickness d mainly. It should be noted that if the thickness of the glue 12 is 0.88 mm, the predetermined distance D is equal to the thickness d plus 0.88 mm. In practical applications, the touch panel 10 can be a capacitive touch panel. Generally speaking, the capacitive touch panel can be manufactured by the following steps of plating a conductive layer on a glass substrate, forming an electrode layer on the conductive layer, and forming a protective film on the electrode layer. If the touch panel 10 is a capacitive touch panel, the touch module 102 comprises the aforesaid conductive layer, electrode layer and protective file and the substrate 104 is the aforesaid glass substrate. It should be noted that the touch panel 10 of the invention is not limited to the capacitive touch panel. In other words, any touch panel capable of performing touch function can be served as the touch module 102.

When a user or an operator wants to assemble the electronic device 1, he or she has to dispose the glue 12 on the bottom 14220 of the second step-shaped structure 1422. When the substrate 104 of the touch panel 10 is accommodated in the second recess portion 1442 of the front casing 14, the periphery of the substrate 104 is adhered to the periphery of the second recess portion 1442 by the glue 12, such that the touch panel 10 is fixed to the second side S2 of the front casing 14. In this embodiment, the lower surface 1020 of the touch module 102 can cover the frame 142 of the front casing 14 through appropriate design, so as to present a full-face vision effect. Afterward, the display panel 16, which is fixed to the shielding member 20, is fixed to the first side S1 of the front casing 14. Finally, the front casing 14 is combined with the back casing 26 so as to complete the assembly of the electronic device 1.

As shown in FIG. 2, the circuit board 18 can be disposed in an accommodating recess 1410 and electrically connected to the display panel 16 and the touch panel 10. In this embodiment, A hole 140 can be formed on a lower position of the front casing 14 and is close to the accommodating recess 1410. the touch panel 10 has a cable 100. When the touch panel 10 is disposed on the front casing 14, the cable 100 can pass through the hole 140 and is electrically connected to the circuit board 18. Furthermore, the display panel 16 is electrically connected to the circuit board 18 by a cable 160.

Compared to the prior art, the touch panel and the display panel of the invention are fixed to the first side and the second side of the front casing respectively, so that the touch panel and the display panel are separated by a predetermined distance. Therefore, once the exposed touch panel is hit by an external force, the predetermined distance acts as a cushion to the display panel, such that the display panel having higher cost will not be damaged. Furthermore, the damaged touch panel can be replaced by a new one individually without detaching the display panel from the electronic device. Moreover, since the lower surface of the touch module can cover the frame of the front casing completely, the electronic device of the invention can present a full-face vision effect for a user.

Those skilled in the art will readily observe that numerous modifications and alterations of the device and method may be made while retaining the teachings of the invention.

What is claimed is:

1. An electronic device with touch function comprising:
a back casing;
a front casing combined with the back casing so as to form an accommodating space;
a display panel disposed in the accommodating space; and
a touch panel fixed to a second side of the front casing and departed from the display panel with a predetermined distance, the second side is opposite to a first side of the front casing;
wherein the front casing has a frame located at the second side, a recess is formed within the frame, the touch panel comprises a touch module and a substrate, and the substrate is located at a lower surface of the touch module and accommodated in the recess;
wherein the frame comprises a first step-shaped structure and a second step-shaped structure, the recess comprises a first recess portion and a second recess portion, the first step-shaped structure surrounds the first recess portion, the second step-shaped structure surrounds the second recess portion, the touch module is accommodated in the first recess portion, and the substrate is accommodated in the second recess portion.

2. The electronic device with touch function of claim 1, wherein the display panel is fixed to the first side of the front casing, the touch panel is adhered to the second side of the front casing by a glue and the predetermined distance is larger than a thickness of the glue.

3. The electronic device with touch function of claim 2, wherein a periphery of the substrate is adhered to the second recess portion by the glue.

4. The electronic device with touch function of claim 1, wherein the lower surface of the touch module covers the frame completely, and an upper surface of the frame and an upper surface of the touch module are at an identical level substantially.

5. The electronic device with touch function of claim 1, further comprising a circuit board disposed in the accommodating space and electrically connected to the display panel and the touch panel, wherein a hole is formed on the front casing, the touch panel has a cable, and the cable passes through the hole and is electrically connected to the circuit board.

6. The electronic device with touch function of claim 1, further comprising a shielding member disposed in the accommodating space, wherein the display panel is fixed to the shielding member.

7. The electronic device with touch function of claim 1, further comprising a heat dissipating unit disposed in the accommodating space, wherein the back casing has an opening and the heat dissipating unit dissipates heat via the opening.

8. The electronic device with touch function of claim 1, further comprising a speaker disposed in the accommodating space, wherein the back casing has an opening and the speaker generates sounds via the opening.

9. An electronic device with touch function comprising:
a back casing;
a front casing combined with the back casing so as to form an accommodating space;
a display panel disposed in the accommodating space and fixed to a first side of the front casing; and
a touch panel fixed to a second side of the front casing and not fixed to the display panel immediately, the second side being opposite to the first side;
wherein the front casing has a frame located at the second side, a recess is formed within the frame, the touch panel comprises a touch module and a substrate, and the substrate is located at a lower surface of the touch module and accommodated in the recess;
wherein the frame comprises a first step-shaped structure and a second step-shaped structure, the recess comprises a first recess portion and a second recess portion, the first step-shaped structure surrounds the first recess portion, the second step-shaped structure surrounds the second recess portion, the touch module is accommodated in the first recess portion, and the substrate is accommodated in the second recess portion.

10. The electronic device with touch function of claim 9, wherein the touch panel is departed from the display panel with a predetermined distance, the touch panel is adhered to the second side of the front casing by a glue, and the predetermined distance is larger than a thickness of the glue.

11. The electronic device with touch function of claim 10, wherein a periphery of the substrate is adhered to the second recess portion by the glue.

12. The electronic device with touch function of claim 9, wherein the lower surface of the touch module covers the frame completely, and an upper surface of the frame and an upper surface of the touch module are at an identical level substantially.

13. The electronic device with touch function of claim 9, further comprising a circuit board disposed in the accommodating space and electrically connected to the display panel and the touch panel, wherein a hole is formed on the front casing, the touch panel has a cable, and the cable passes through the hole and is electrically connected to the circuit board.

14. The electronic device with touch function of claim 9, further comprising a shielding member disposed in the accommodating space, wherein the display panel is fixed to the shielding member.

15. The electronic device with touch function of claim 9, further comprising a heat dissipating unit disposed in the accommodating space, wherein the back casing has an opening and the heat dissipating unit dissipates heat via the opening.

16. The electronic device with touch function of claim 9, further comprising a speaker disposed in the accommodating space, wherein the back casing has an opening and the speaker generates sounds via the opening.

* * * * *